US 6,586,699 B1

(12) United States Patent
Gianchandani et al.

(10) Patent No.: US 6,586,699 B1
(45) Date of Patent: Jul. 1, 2003

(54) MICRO-ELECTRO-DISCHARGE MACHINING UTILIZING SEMICONDUCTOR ELECTRODES

(75) Inventors: Yogesh B. Gianchandani, Ann Arbor, MI (US); Kenichi Takahata, Ann Arbor, MI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 0 days.

(21) Appl. No.: 10/079,312

(22) Filed: Feb. 20, 2002

(51) Int. Cl.⁷ .............................. B23H 1/00; B23H 1/04; B23H 1/06
(52) U.S. Cl. .................................. 219/69.17; 219/69.15
(58) Field of Search ........................... 219/69.17, 69.15

(56) References Cited

U.S. PATENT DOCUMENTS

| 5,206,983 A | 5/1993 | Guckel et al. |
| 5,286,944 A * | 2/1994 | Li ........................... 219/69.15 |
| 5,378,583 A | 1/1995 | Guckel et al. |
| 2002/0179573 A1 * | 12/2002 | Gianchandani et al. .. 219/69.17 |

FOREIGN PATENT DOCUMENTS

JP          2000-202718         7/2000

OTHER PUBLICATIONS

Takahisa Masuzawa, et al., "The Occurring Mechanism of the Continuous Arc in Micro–Energy EDM by RC Circuit," J. of Electrical Machining, vol. 5, No. 9, 19__, pp. 35–51 (in Japanese, with English abstract).

H. Guckel, et al., "On the Application of Deep X–Ray Lithography with Sacrificial Layers to Sensor and Actuator Construction (The Magnetic Micromotor with Power Take-offs),"IEEE Intl. Conf. on Solid–State Sensors and Actuators (Transducers '91), paper substitutions, San Fancisco, California, Jun., 1991.

Kenichi Takahata, et al., "A Novel Micro Electro–Discharge Machining Method Using Electrodes Fabricated by the LIGA Process," Tech. Dig., IEEE Intl. Conf. on Micro Electro Mechanical Systems (MEMS '99), Orlando, Florida, Jan., 1999, pp. 238–243.

K. Takahata, et al., "High–Aspect Ratio WC–Co Microstructure Produced by the Combination of LIGA and Micro–EDM," Microsystem Technologies, vol. 6, No. 5, Aug., 2000, pp. 175–178.

(List continued on next page.)

*Primary Examiner*—Geoffrey S. Evans
(74) *Attorney, Agent, or Firm*—Foley & Lardner

(57) ABSTRACT

Micro-electro-discharge machining is carried out utilizing a semiconductor array electrode having a substrate with a face surface and electrode protrusions extending from the face surface. The array electrode may be formed by lithographically patterning a semiconductor wafer such as a silicon wafer utilizing lithographic techniques of the type used in semiconductor device processing. The electrode protrusions in the surface of the substrate may be coated with a conducting metal. The electrode is positioned adjacent to a workpiece and a power supply is connected to the electrode and the workpiece to charge a capacitor until discharge takes place between the electrode protrusions and the surface of the workpiece, to electro-discharge-machine the workpiece to replicate the pattern of electrode protrusions into the workpiece. The semiconductor electrode is formed to be consumed during the machining process, during which many individual workpiece elements can be micromachined in parallel to provide rapid and economical production of micromachined parts.

12 Claims, 3 Drawing Sheets

OTHER PUBLICATIONS

Richard T. Medary, "Inexpensive, rapid field screening test for 2,4,6–trinitrotoluene in soil," *Analytica Chimica Acta* 258, pp. 341–346, Elsevier Science Publishers B.V., Amsterdam, 1992.

Ken'ichi Takahata, et al., "Batch Mode Micro–EDM for High–Density and High Throughput Micromachining," IEEE Intl. Conf. on Micro Electro Mechanical Systems (MEMS 01), Jan. 2001, pp. 72–75.

Wolfgang Ehrfeld, et al., "Micro Electro Discharge Machining as a Technology in Micro Machining," SPIE Micro Machining and Micro Fabrication Process Technology II, Austin, Texas, Oct. 14–25, 1996, SPIE vol. 2879, pp. 332–337, 1996.

A. Wolf, et al., "Application of New Actuator and Vision Control Systems for Micro Electro Discharge Machining," SPIE Conference on Intelligent Systems in Design and Manufacturing, Boston, Massachusetts, Nov. 1998, SPIE vol. 3517, pp. 149–157, 1998.

O. Koch, et al., "Micro–Electro Discharge Machining— Application, Strategy and Technology," IWMF 2000, $2^{nd}$ International Workshop on Micro Factories, Fribourg, Switzerland, Oct. 9–10, 2000.

United Sates patent application Ser. No. 09/482,436, filed Jul. 13, 2000, by Kenichi Takahata, entitled "Method of Manufacturing Machining Tool Electrode and Machining Method," Group Art Unit 2825, Examiner Pham.

* cited by examiner

MICRO-ELECTRO-DISCHARGE MACHINING UTILIZING SEMICONDUCTOR ELECTRODES

REFERENCE TO GOVERNMENT RIGHTS

This invention was made with United States government support awarded by the following agency: NSF Grant No: 9985422. The United States has certain rights in this invention.

FIELD OF THE INVENTION

This invention pertains generally to the field of electro-discharge machining and to micro-electromechanical devices and processes for producing such devices.

BACKGROUND OF THE INVENTION

Micro-electro-discharge machining (micro-EDM) is a microfabrication technique that is well suited to cutting electrically conductive materials such as steel, graphite, silicon and magnetic materials. See, e.g., D. Reynaerts, et al., "Integrating Electro-Discharge Machining and Photolithography: Work in Progress," J. of Micromechanics and Microengineering, Vol. 10, No. 2, June, 2000, pp. 189–195; Y. Honma, et al., "Micro-Machining of Magnetic Metal Film Using Electro-Discharge Technique," Advances in Information Storage Systems, Vol. 10, 1999, pp. 383–399; C. A. Grimes, et al., "Magnetoelastic Microsensors for Environmental Monitoring," Tech. Dig., IEEE Intl. Conf. on Micro Electro Mechanical Systems (MEMS '01), Interlaken, Switzerland, January, 2001, pp. 278–281. Micro-EDM involves the sequential discharge of electrical pulses between a microscopic electrode and the workpiece while both are immersed in a dielectric oil. See, generally, T. Masaki, et al., "Micro Electro-Discharge Machining and its Applications," Proc., IEEE Intl. Conf. on Micro Electro Mechanical Systems (MEMS '90), Napa Valley, Calif., February, 1990, pp. 21–26. The pulse discharge timing is controlled by a simple resistor-capacitor (RC) circuit. In conventional micro-EDM, the electrode is a cylindrical metal element from 5 to 300 $\mu$m in diameter. Although micro-EDM has been used commercially for applications such as ink-jet nozzle fabrication, the traditional process is limited in throughput because it is a serial process. The use of a single electrode limits not only the throughput, but also precision, because the electrodes themselves are individually shaped by using a micro-EDM technique-wire electrode-discharge grinding (WEDG)—and variation may occur in the electrode shape. See, e.g., T. Masuzawa, et al., "Wire Electro-Discharge Grinding for Micro-Machining," Ann. CIRP, Vol. 34, 1985, pp. 431–434.

To address the throughput and material issues that limit conventional micro-EDM, batch mode micro-EDM has been developed using LIGA-fabricated electrodes. The LIGA process uses x-ray lithography to form high aspect ratio molds for electroplated structures. For a general discussion of the LIGA process, see W. Ehrfeld, et al., "LIGA Process: Sensor Construction Techniques via X-Ray Lithography," Tech. Dig., IEEE Intl. Conf. on Solid-State Sensors and Actuators Workshop (Hilton Head '88), June, 1988, pp. 1–4. Electroplated copper electrodes formed using the LIGA process have been shown to provide acceptable wear resistance. K. Takahata, et al., "A Novel Micro Electro-Discharge Machining Method Using Electrodes Fabricated by the LIGA Process," Tech. Dig., IEEE Intl. Conf. on Micro Electro Mechanical Systems (MEMS '99), Orlando, Fla., January, 1999, pp. 238–243. Parallel machining to provide perforations in stainless steel by using 3×4 arrayed electrodes with 100 $\mu$m diameter and 500 $\mu$m pitch was also demonstrated. Sequential application with electrode arrays has also been utilized to produce a 1-mm long WC-Co super-hard alloy mechanical processing tool. K. Takahata, et al., "High-Aspect-Ratio WC-Co Microstructure Produced by the Combination of LIGA and Micro-EDM," Microsystem Technologies, Vol. 6, No. 5, August, 2000, pp. 175–178. LIGA fabricated EDM electrode arrays have been developed to achieve parallelism and increase throughput. K. Takahata, et al., "Batch Mode Micro-EDM for High-Density and High-Throughput Micromachining," IEEE Intl. Conf. on Micro Electro Mechanical Systems (MEMS '01), 2001, pp. 72–75; Ken'ichi Takahata, et al., "Parallel Discharge with Partitioned Electrode Arrays for Accelerated Batch Mode Micro-EDM," Transducers '01, Germany, Jun. 4, 2001.

SUMMARY OF THE INVENTION

In accordance with the invention, parallel batch micromachining is carried out utilizing a semiconductor array electrode that may be formed by conventional semiconductor processing techniques at low cost. The semiconductor array electrode includes a semiconductor substrate having a face surface and multiple semiconductor electrode protrusions extending from the face surface formed integrally with the substrate semiconductor. The substrate and protrusions are doped to be electrically conductive, and may be coated with a metal to increase conductivity and wear resistance. The semiconductor array electrode may be formed utilizing semiconductor processing techniques by masking a wafer of semiconductor, such as crystalline silicon, in a pattern corresponding to the electrode protrusions to be formed. An anisotropic etchant is then applied to the masked wafer to anisotropically etch the wafer in the regions not covered by the mask. The mask is then removed to leave the protrusions extending above the etched regions of the wafer.

In use, the array electrode is positioned adjacent to a workpiece to be machined, with dielectric fluid between the array electrode and the workpiece. A voltage is then applied from a voltage source between the workpiece and the array electrode to charge a capacitor conducted between the workpiece and the electrode. The charge on the capacitor builds until it reaches a sufficient level to provide a discharge of current between the electrode protrusions and the workpiece to micromachine the workpiece.

The present invention is well suited to carry out micromachining on materials, such as brass, which are difficult to etch using lithographic processes. Although the semiconductor electrode is consumed during the micromachining process and is disposed after a single use, a large semiconductor wafer (particularly silicon) can be lithographically patterned over the surface of the wafer and can be applied to micromachine many parts in a workpiece simultaneously, providing highly efficient and low cost micromachining of multiple parts.

Further objects, features and advantages of the invention will be apparent from the following detailed description when taken in conjunction with the accompanying drawings.

DETAILED DESCRIPTION OF THE INVENTION

Figure 1:
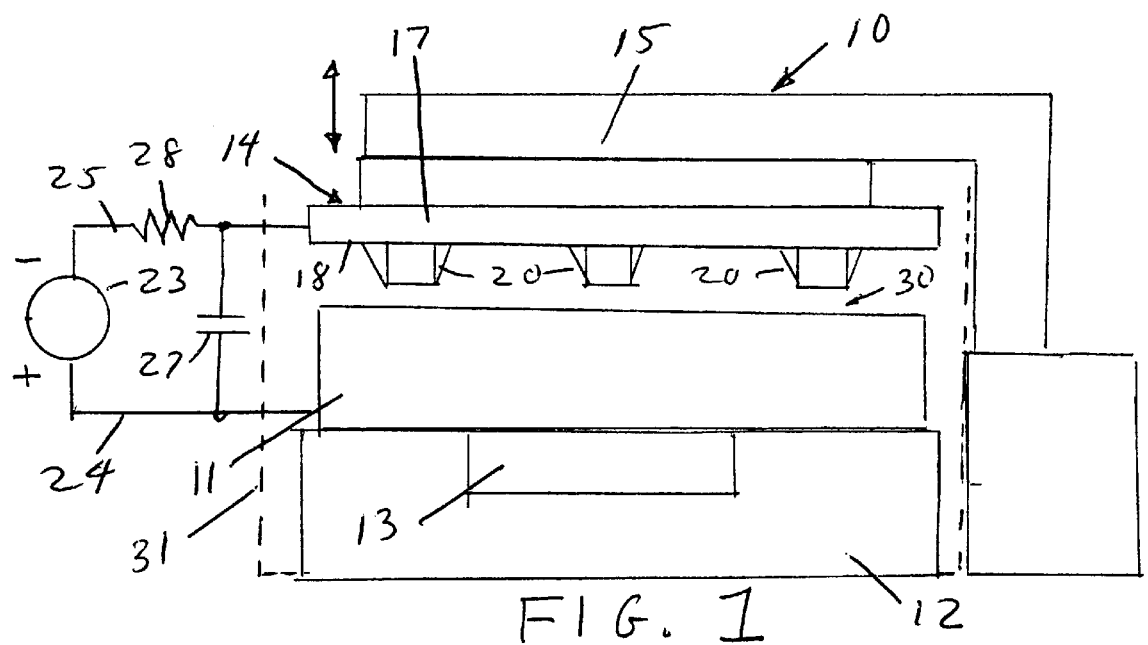
FIG. 1 is a schematic view of the micro-electro-discharge machining apparatus utilizing semiconductor electrodes in accordance with the invention.

With reference to the drawings, apparatus for carrying out micro-electro-discharge machining (micro-EDM) in accordance with the invention is shown generally at 10 in FIG. 1 in position for carrying out machining processes on a workpiece 11. The workpiece 11 is supported on a base 12, which preferably electrically isolates the workpiece, and may incorporate a vibrator 13 for vibrating the workpiece in a conventional manner. A semiconductor array electrode 14 is mounted on a holder 15 which may be of conventional construction for micro-EDM machining. The semiconductor array electrode 14 in accordance with the invention includes a substrate 17 formed of semiconductor which has a face surface 18 which may be generally flat as illustrated in FIG. 1. Multiple electrode protrusions 20 of a selected shape extend from the face surface 18 in a selected pattern, and are formed integrally with and of the same semiconductor material as the substrate 17.

Figure 2:
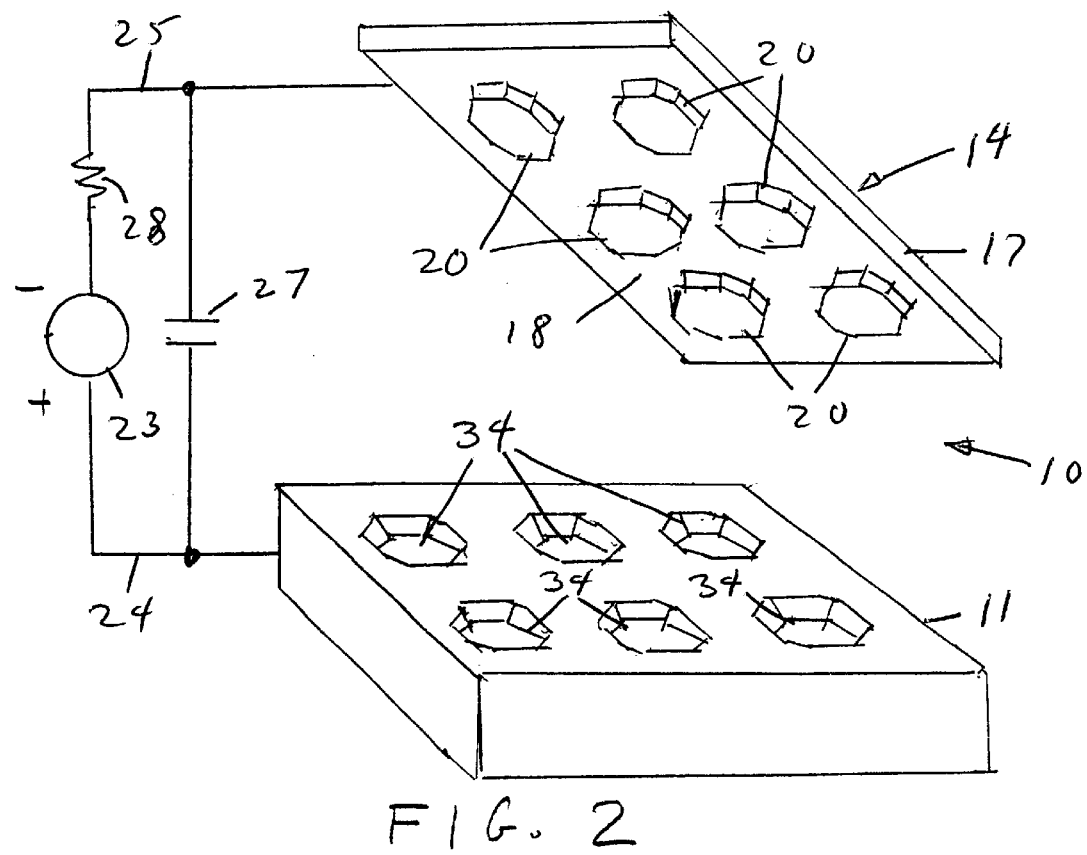
FIG. 2 is a simplified perspective view of a semiconductor array electrode in accordance with the invention positioned adjacent to a workpiece.

In a manner similar to conventional EDM processing, a DC power supply 23 is connected via lines 24 and 25 to the workpiece 11 and the array electrode 14, respectively. A capacitor 27 is connected across the lines 24 and 25, and a resistor 28 is connected in the line 25 from the power supply 23 to the array electrode 14. For carrying out micro-EDM with the apparatus 10, a dielectric oil is provided to the region 30 between the EDM electrode 14 and the workpiece 11, e.g., by immersing the workpiece 11 and the electrode 14 in an oil bath held in a container 31 (shown in dashed lines in FIG. 1). The capacitor 27 is charged from the power supply 23 through the resistor 28, and a voltage is built up across the capacitor 27 until the voltage between the electrode protrusions 20 and the workpiece 11 is sufficient to result in arcing from the protrusions 20 to the workpiece, with consequent electro discharge machining of the workpiece 11 in a pattern of machined areas 34, as shown in FIG. 2, which matches the pattern (and the inverse of the shape) of the protrusions 20 on the electrode 14.

The array electrode 14 is particularly suited to be formed of conventional semiconductors, particularly crystalline silicon. In forming the semiconductor array electrode 14, a wafer of semiconductor, such as a large wafer of crystalline silicon of the type used in forming integrated circuits and other semiconductor devices, has a mask lithographically formed thereon of photoresist material in a pattern corresponding to the positions on the surface of the semiconductor wafer at which the electrode protrusions 20 are to be formed. The wafer is preferably heavily doped so it is conductive. After masking, an anisotropic etchant, such as KOH for silicon, is applied to the surface of the semiconductor wafer that is left exposed by the mask, resulting in etching away of the semiconductor material anisotropically, leaving the formed protrusions 20 extending upwardly from the face 18 of the substrate at which the etching terminated. The mask is then removed and the protrusions 20 and the surface 18 of the substrate may be coated with a conductor such as aluminum to improve conductivity and wear resistance.

The micro EDM apparatus of the invention may be operated using conventional micro EDM machines, e.g., a Panasonic MG-ED72W micro EDM.

Figure 3:
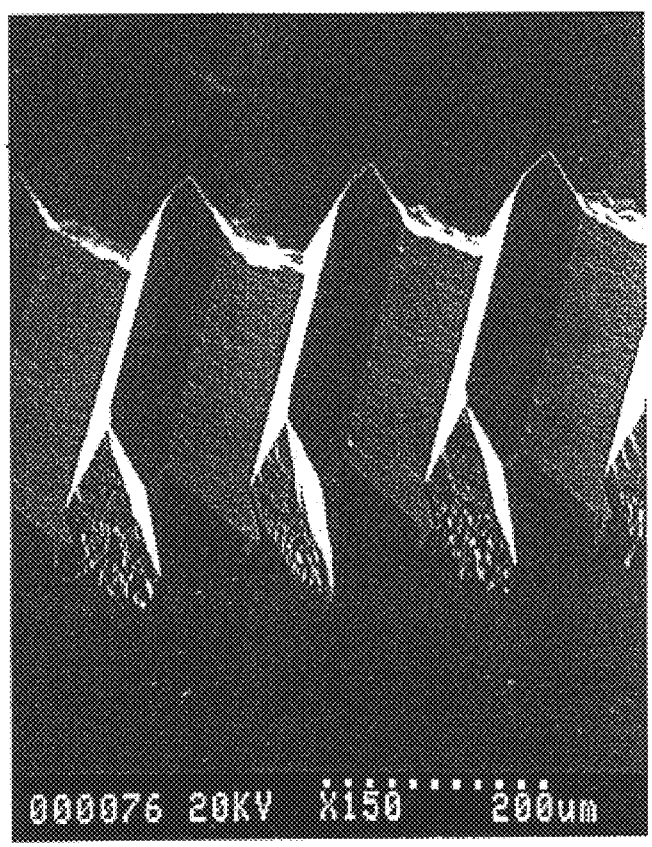
FIG. 3 is a photomicrograph of an aluminum coated silicon array electrode having a selected pattern of electrode protrusions.
Figure 4:
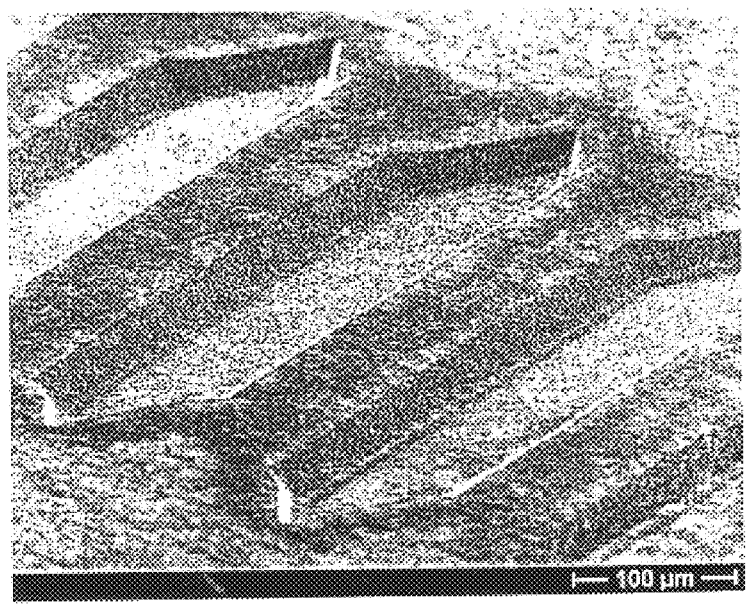
FIG. 4 is a photomicrograph of a brass workpiece micromachined utilizing the array electrode of FIG. 3.
Figure 5:
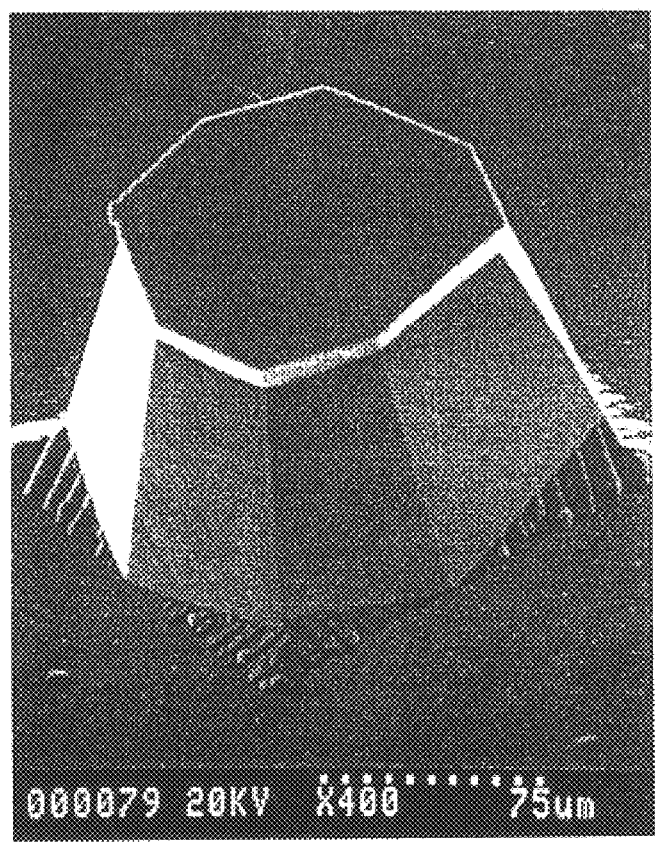
FIG. 5 is a photomicrograph of an aluminum coated silicon array electrode having another selected pattern of electrode protrusions.
Figure 6:
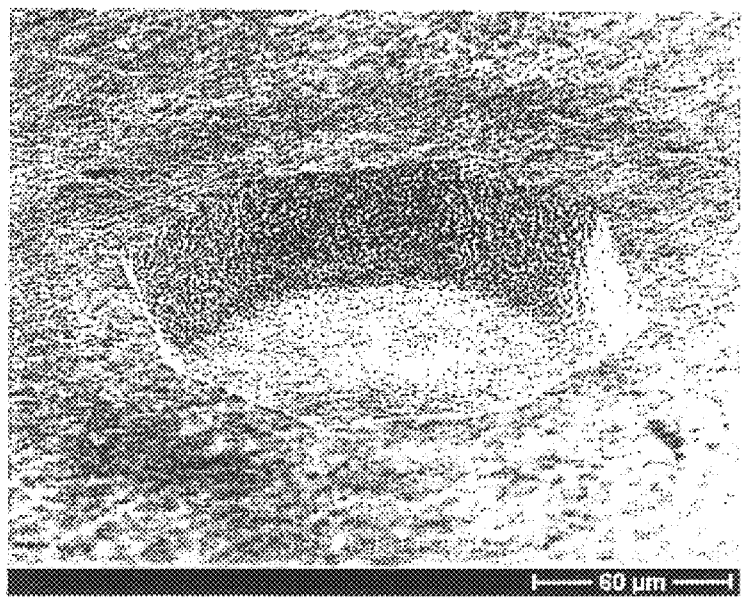
FIG. 6 is a photomicrograph of a brass workpiece micromachined utilizing the array electrode of FIG. 5.

As an example of micro EDM machining in accordance with the invention, a <100> boron doped p-type silicon wafer was masked and etched by a KOH anisotropic wet etch. A 3 $\mu$m coating of aluminum was sputtered on the shaped silicon wafer, and aluminum was annealed at 480° C. for 25 minutes to provide an ohmic contact. Micromachining was carried out utilizing the semiconductor array electrode on brass workpieces with the Panasonic MG-ED72W micro-EDM machine. The EDM conditions were: 80V output voltage for the power supply 23, 100 PF for the capacitor 27, with the electrode advanced 20–30 $\mu$m at a rate of 2 $\mu$m/s and with the electrode dithered with an amplitude of 15 $\mu$m. Depressions were machined into the surface of the brass workpiece that replicated the shape of the protrusions on the silicon array electrode. FIGS. 3 and 5 show examples of aluminum coated silicon array electrodes utilized, and FIGS. 4 and 6 show the depressions machined into a brass workpiece using the electrodes of FIGS. 3 and 5, respectively.

The invention may be carried out using other semiconductors for the array electrode in addition to silicon, e.g., germanium and gallium-arsenide, and the electrodes can be utilized to machine substances other than metals, e.g., other semiconductors. The invention may be used to cut entirely through a workpiece, e.g., to dice a semiconductor wafer. Etching can be carried out utilizing any appropriate anisotropic etching process, including dry etching as well as wet etching, and thin films of various materials such as metals (in addition to aluminum) may be deposited on the surface of the machined electrodes to enhance wear resistance during electrode discharge machining.

It is understood that the invention is not confined to the particular embodiments set forth herein as illustrative, but embraces all such forms thereof that come within the scope of the following claims.

What is claimed is:

1. A method of micro-electro-discharge machining comprising:
   (a) providing a semiconductor array electrode comprising a semiconductor substrate with a face surface and with multiple electrode protrusions extending from the face surface that are integrally formed with the substrate semiconductor, the semiconductor material of the substrate and the protrusions doped to be conductive;
   (b) positioning the array electrode adjacent to a workpiece to be machined with dielectric fluid between the array electrode and the workpiece; and
   (c) applying a voltage between the workpiece and the array electrode to charge a capacitor electrically connected between the workpiece and the array electrode until the charge on the capacitor builds to a sufficient level to provide a discharge of current between the electrode protrusions and the workpiece to micromachine the workpiece.

2. The method of claim 1 wherein the substrate and protrusions are integrally formed of crystalline silicon.

3. The method of claim 1 further including coating the protrusions and the face surface of the substrate with a conductive metal before positioning the electrode array adjacent to a workpiece.

4. The method of claim 1 wherein the step of providing a semiconductor array electrode comprises masking a wafer of semiconductor in a pattern corresponding to the electrode protrusions to be formed, applying an anisotropic etchant to the masked wafer to anisotropically etch the wafer in regions not covered by the mask, and then removing the mask to leave the electrode protrusions extending above the face surface of the wafer that is left after etching the wafer.

5. The method of claim 4 further including coating the protrusions and the face surface of the wafer with a conductive metal.

6. The method of claim 1 further including vibrating the semiconductor electrode array in a direction perpendicular to the face surface of the substrate while applying a voltage between the workpiece and the array electrode.

7. Micro-electro-discharge machining apparatus comprising:

(a) a semiconductor array electrode comprising a semiconductor substrate with a face surface and with multiple electrode protrusions extending from the face surface that are integrally formed with the substrate semiconductor, the semiconductor material of the substrate and the protrusions doped to be conductive;

(b) an electrical power source having a positive terminal and a negative terminal; and (c) conductors electrically connecting one of the terminals of the power source to the array electrode substrate and electrically connecting the other of the terminals to a workpiece to be machined, a capacitor connected across the conductors, and a resistor connected in a conducting line leading from the power source to the capacitor.

8. The apparatus of claim 7 wherein the substrate and electrode protrusions are integrally formed of crystalline silicon.

9. The apparatus of claim 8 including a coating of conductive metal over the electrode protrusions and the face surface of the substrate.

10. The apparatus of claim 7 wherein the substrate and electrode protrusions are doped with boron to be conductive.

11. The apparatus of claim 7 wherein the semiconductor array electrode comprises a crystalline silicon wafer that has been lithographically patterned and etched to provide multiple patterns over the surface of the wafer defining the electrode protrusions to carry out multiple separate machining operations on a workpiece or workpieces simultaneously.

12. The apparatus of claim 7 further including a workpiece formed of brass to which one of the terminals of the power supply is electrically connected.

\* \* \* \* \*